United States Patent [19]

Mase et al.

[11] Patent Number: 5,496,641
[45] Date of Patent: Mar. 5, 1996

[54] PLASTIC LENS

[75] Inventors: Shoji Mase; Noboru Otani, both of Odawara; Motoaki Yoshida, Tokyo; Satoshi Ishizuka; Hisayuki Kayanoki, both of Takarazuka; Naoto Hirayama, Yokkaichi, all of Japan

[73] Assignee: Nippon Sheet Glass Co., Ltd., Osaka, Japan

[21] Appl. No.: 896,966

[22] Filed: Jun. 11, 1992

[30] Foreign Application Priority Data

Jun. 13, 1991 [JP] Japan ..................... 3-141696
Jun. 13, 1991 [JP] Japan ..................... 3-141699
Apr. 22, 1992 [JP] Japan ..................... 4-103021

[51] Int. Cl.$^6$ ..................... B32B 27/00; B32B 9/04
[52] U.S. Cl. ..................... 428/423.1; 428/423.3; 428/425.5; 428/425.9; 428/447; 428/448; 428/473.5
[58] Field of Search ..................... 428/423.1, 423.3, 428/425.5, 425.9, 447, 448, 473.5

[56] References Cited

U.S. PATENT DOCUMENTS 4,765,729  8/1988  Taniguchi ..................... 351/163
4,904,525  2/1990  Taniguchi ..................... 428/328

FOREIGN PATENT DOCUMENTS 0235743     9/1987   European Pat. Off. .
0404111A3  12/1990   European Pat. Off. .
62-011801   1/1987   Japan .
01217402A   8/1989   Japan .

OTHER PUBLICATIONS

Asahi Optical, Patent Abstracts of Japan, vol. 13, No. 530 (p–966) 27 Nov. 1989 Abstracting JP-A-1 217 402.
Mitsui Toatsu, Patent Abstracts of Japan, vol. 14, No. 78 (P–1006) 14 Feb. 1990, Abstracting JP-A-1 295 201.
Seiko Epson, Patent Abstracts of Japan, vol. 11, No. 181 (p–585) 11 Jun. 1987, Abstracting JP-A-62 011 801.
Hoya Corp., Patent Abstracts of Japan, vol. 12, No. 315 (m–735) 26 Aug. 1988 Abstracting JP-A-63 097 223.

*Primary Examiner*—Leszek Kiliman
*Attorney, Agent, or Firm*—Wenderoth, Lind & Ponack

[57] ABSTRACT

A plastic lens formed by laminating, in the order as described below, (A) a plastic lens substrate having a refractive index in the range of 1.50 to 1.70, (B) a primer layer containing a metal compound of at least one metal selected from the group consisting of Al, Ti, Zr, Sn and Sb and a polyurethane, or (B') a primer layer formed from a polyurethane containing at least one element selected from the group consisting of Cl, Br, I and S, (C) a hard coating layer, and (D) a single-layered or multi-layered anti-reflection layer formed by vapor-depositing an inorganic substance.

11 Claims, No Drawings

PLASTIC LENS

DETAILED DESCRIPTION OF THE INVENTION

The present invention relates to a plastic lens. More specifically, it relates to a plastic lens which has an improved appearance and is excellent in wear resistance, impact resistance, dyeability, anti-reflection properties, weather resistance, chemical resistance and adhesion of a coating.

In recent years, plastics which are light in comparison with glass have been attracting attention as materials For eye-glasses, and many plastic lenses having a high refractive index and a low chromatic aberration are on the market. Since the plastic lenses generally have a defect in that they are liable to be scratched, the plastic lenses are usually provided with a silicon-based hard coating layer on the lens surface, and the plastic lenses are also provided with an inorganic material-vapor deposited anti-reflection coating layer on the hard coating layer to prevent surface reflection which causes the flicker of an image.

A hard coating layer generally has a refractive index in the range of 1.40 to 1.50, and a plastic lens substrate generally has a refractive index of 1.50 or higher. Although there is no problem when the thickness of the hard coating layer is uniform, with an increase in a difference between the above refractive indices, interference fringes appear when the hard coating layer thickness is non-uniform, and consequently, such a lens is notably poor in appearance. From a standpoint of the production, however, it is very difficult to produce a hard coating layer having a uniform thickness.

Under the circumstances, Japanese Laid-open Patent Publications Nos. 11801/1987 and 217402/1989 disclose the provision of a primer layer between a lens substrate and a hard coating layer.

Since, however, the material for the primer layer disclosed in Japanese Laid-open Patent Publication No. 11801/1987 is selected from an aromatic homopolymer, a copolymer of an aromatic homopolymer and an acrylic compound, an epoxy compound and a silicon-based compound, the impact resistance of the plastic lens after provided with an anti-reflection layer is insufficient.

Japanese Laid-open Patent Publication No. 217402/1989 discloses the use of a polyurethane obtained from polyol and polyisocyanate at least one of which contains an aromatic ring in order to form a primer layer having a refractive index of at least 1.50

However, the above polyurethane considerably causes weather resistance deterioration (yellowing) of a plastic lens as a product. As far as the present inventors know, there is no plastic lens which is free from interference fringes, excellent in impact resistance after being provided with an anti-reflection coating and excellent in weather resistance.

It is an object of the present invention to provide a plastic lens having excellent physical properties.

It is another object of the present invention to provide a plastic lens which is free from interference fringes, excellent in impact resistance after being provided with an anti-reflection coating, and excellent in weather resistance (free from yellowing).

Other objects and advantages of the present invention will be apparent from the following description.

According to the present invention, the above objects and advantages of the present invention are first achieved by a plastic lens formed by laminating, in the order described below, (A) a plastic lens substrate having a refractive index in the range of 1.50 to 1.70, (B) a primer layer comprising a metal compound of at least one metal selected from the group consisting of Al, Ti, Zr, Sn and Sb and a polyurethane, having a refractive index in the range of 1.45 to 1.60 and satisfying both the following equation (1), $$\sqrt{n_s \cdot n_H} + \frac{|n_s - n_H|}{4} \geq n_p \geq \sqrt{n_s \cdot n_H} - \frac{|n_s - n_H|}{4} \quad (1)$$

wherein:

$n_s$ is the refractive index of the plastic lens substrate (A), $n_H$ is the refractive index of a hard coating layer (C) to be described later, and $n_p$ is the refractive index of the primer layer (B), and the following equation (2), $$d = \lambda/4n_p \quad (2)$$

wherein:

$\lambda$ is the wavelength of visible light at 450 to 650 nm.

$n_p$ is as defined above, and d is the thickness (nm) of the primer layer (B), (C) a hard coating layer, and (D) a single-layered or multi-layered anti-reflection layer formed by vapor-depositing an inorganic substance.

The present invention will be detailed hereinafter.

In the present invention, the plastic lens substrate (A) is not specially limited as to the kind, and examples thereof include transparent resin having a refractive index of 1.50 to 1.70, such as polycarbonate, an acrylic resin, a styrene resin, a urethane resin and an allyl resin.

Particularly preferred are a plastic lens formed of a polymer obtained by radical-polymerization of a monomer which mainly contains a diethylene glycol bisallylcarbonate of the formula (1),

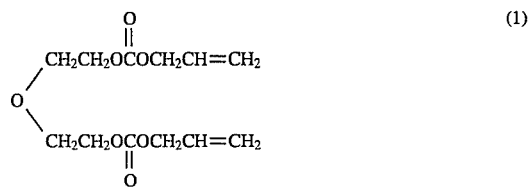

and a plastic lens formed of a polymer obtained by radical-polymerization of a monomer mixture containing an N-substituted phenylmaleimide derivative.

The plastic lens used in the present invention is produced by a polymerization method used for the production of ordinary plastic lenses. For example, the plastic lens is produced by a method in which a monomer mixture is cast into a casting mold formed of a glass mold and a gasket made from an ethylene-vinyl acetate copolymer, heating it at a predetermined temperature for a predetermined period of time, taking out the product from the glass mold, and then post-curing it at a predetermined temperature for a predetermined period of time.

In the present invention, a layer composed of a metal compound and a polyurethane, as the primer layer (B), is formed on the above plastic lens substrate. Preferred as a polyurethane is a thermosetting polyurethane obtained by a reaction between a polyol which is an active hydrogen compound and a polyisocyanate. Examples of the polyol include polyester having a plurality of hydroxyl groups in the molecule, polyether, polycaprolactone, polycarbonate and polyacrylate (acrylpolyol).

The polyisocyanate is classified into a blocked polyisocyanate and a non-blocked polyisocyanate. In the present invention, it is preferred to use a blocked polyisocyanate. The blocked polyisocyanate refers to a polyisocyanate of which the isocyanate group is blocked with a blocking agent. The reason for the preference to a blocked polyisocyanate in the present invention is as follows. When a non-blocked polyisocyanate is used, the active hydrogen of polyol and the isocyanate group are liable to react at room temperature and the pot life of a primer layer coating composition is therefore greatly decreased. In contrast, a blocked polyisocyanate can react with active hydrogen only after the blocking agent is dissociated under heat. Therefore, the pot life is advantageously very long at room temperature.

Examples of the polyisocyanate include hexamethylene diisocyanate, isophorone diisocyanate, 4,4'-dicyclohexylmethane diisocyanate, hydrogenated xylylene diisocyanate and addition products thereof. Examples of the addition products include isocyanurates, allophanates, biurets and carbodiimides. As the blocked polyisocyanate, particularly preferred is a polyisocyanate obtained by blocking a cyclic trimer of hexamethylene diisocyanate, i.e., isocyanurate, with a β-diketone. The polyisocyanate blocked with a β-diketone as a blocking agent can be cured at a temperature of 100° C. or lower since the blocking agent dissociates at a low temperature, and therefore, such blocked polyisocyanate can be used for the production of a lens of which high heat resistance is not required, e.g. a plastic lens having a glass transition temperature of not higher than 110° C. Examples of the β-diketone preferably include acetylacetone, 2,4-hexanedione, 2,4-heptanedione and 3,5-heptanedione.

Examples of the polyol include compounds having a plurality of hydroxyl groups in the molecule such as polyesters, polyethers, polycaprolactone, polycarbonates and polyacrylates. The blocked polyisocyanate and the polyol are used in such amounts that the isocyanate group/hydroxyl group molar ratio is from 0.5/1 to 1.5/1, particularly preferably from 0.85/1 to 1.2/1. When this molar ratio is less than 0.5/1 or greater than 1.5/1, the primer layer cured is liable to have too small a crosslinked density to improve the impact resistance.

As the above polyisocyanate and/or polyol, there may be used those having an aromatic ring to increase the refractive index, such as a polyester obtained from terephthalic acid and propylene glycol and isocyanurate of tolylene diisocyanate, which is blocked with β-diketone. Since, however, these compounds greatly deteriorate the weather-resistance of a plastic lens as a product (i.e. cause yellowing), it is desirable not to use them in all cases possible.

The reaction of blocked polyisocyanate and the polyol does not require the presence of a curing catalyst.

The primer layer of the present invention contains a metal compound to increase the refractive index of its own. This metal compound is a compound of at least one metal selected from aluminum (Al), titanium (Ti), zirconium (Zr), tin (Sn) and antimony (Sb). Preferred are fine particles of oxides of the above metals and organometallic compounds such as alcoholates, acylates and chelates of the above metals and oligomers and polymers obtained by polycondensation of these. The "acylate" here refers to those in which at least one of the substituents bonded to the metal atoms is a carboxyl group formed by acylation.

Examples of the above fine particles of metal oxides include fine particles of aluminum oxide, titanium oxide, zirconium oxide, tin oxide and antimony oxide. These may be used alone or in combination. The average particle diameter of the fine particles is preferably 1 to 300 mμ, particularly preferably 5 to 200 mμ. Fine particles having an average particle diameter of less than 1 mμ are difficult to manufacture and impracticably require a high manufacturing cost. The use of fine particles having an average particle diameter of more than 300 mμ renders the primer layer opaque. The refractive indices of fine particles of these metal oxides are 2.0 ($ZrO_2$), 2.0 ($SnO_2$), 2.1 ($TiO_2$), 1.7 ($Sb_2O_5$) and 1.66 ($Al_2O_3$). When the fine particles or these metal oxides are contained in primer layers and the amount of each metal oxide is equal to that of other, the increase in the refractive index of the primer layer is larger when a metal oxide laving a higher refractive index is used than when a metal oxide laving a lower refractive index is used.

Examples of the organometallic compounds include alcoholates such as tetra-n-butoxytitanium, tetrastearyloxytitanium, di-n-butoxy.bis(triethanolaminato)titanium, titanium-i-propoxyoctylene glycolate, tri-i-propoxyaluminum, tetra-n-butoxyzirconium, tri-n-butoxyantimony and tetra-n-butoxytin; acylates such as titanium stearate and tri-n-butoxytitanium monostearate; chelates such as propanedioxytitaniumbis(ethylacetoacetate) and propanedioxytitanium(acetylactonate) (ethyl acetoacetate); oligomers such as dimers and tetramers of tetra-n-butoxytitaniummonostearate; and polymers such as tri-n-butoxytitanium monostearate. These organometallic compounds may be used alone or in combination.

The content of the above metal compound in the primer layer is preferably 1 to 80% by weight, particularly preferably 5 to 70% by weight, further preferably 20 to 60% by weight. When this content is less than 1% by weight, almost no effect is produced on the increase in the refractive index of the primer layer, and the primer layer only shows a refractive index of less than 1.45 at most. On the other hand, when it exceeds 80% by weight, the primer layer becomes opaque.

In the present invention, the primer layer (B) is comprised of a polyurethane obtained from the above polyol and polyisocyanate and the above metal compound, and its refractive index, $n_p$ is in the range of 1.45 to 1.60 (the index is measured against light having a wavelength of 550 nm).

The primer layer (B) satisfies both the following equations (1) and (2).

$$\sqrt{n_s \cdot n_H} + \frac{|n_s - n_H|}{4} \geq n_p \geq \sqrt{n_s \cdot n_H} - \frac{|n_s - n_H|}{4} \qquad (1)$$

wherein:

$n_s$ is the refractive index of the plastic lens substrate (A),
$n_H$ is the refractive index of a hard coating layer (C) to be described later, and
$n_p$ is the refractive index of the primer layer (B).

$$d = \lambda/4n_p \qquad (2)$$

wherein:

λ is the wavelength of visible light at 450 to 650 nm,
$n_p$ is as defined above, and
d is the thickness (nm) of the primer layer (B).

When both the above equations (1) and (2) are satisfied, interference fringes can be almost fully removed. These are caused by the interference between light reflected on the interface of the plastic lens substrate and the primer layer and light reflected on the interface of the primer layer and the hard coating layer.

The primer layer may be formed by a method in which the polyol and the polyisocyanate are preliminarily allowed to react to synthesize a thermoplastic polyurethane, the polyurethane and the metal compound are mixed with a solvent (a dispersion medium from the viewpoint of the fine metal oxide particles) to form a coating composition, the coating composition is applied to a lens substrate, and then the solvent (dispersion medium) is volatilized, or by a method in which a coating composition comprising the polyol, polyisocyanate, metal compound, solvent (dispersion medium) and optionally a curing catalyst is applied to a lens substrate, and then the polyol and the polyisocyanate are allowed to react while volatilizing the solvent (dispersion medium) to obtain a thermosetting polyurethane. In view of the formation of the hard coating layer on the primer layer, preferred is the latter method which permits the formation of a crosslinked polyurethane insoluble in a solvent.

The solvent is selected, for example, from alcohols, ketones, esters and ethers. Other known solvents may be also used. Particularly preferred are diacetone alcohol, ethyl acetate, methyl ethyl ketone and propylene glycol monomethyl ether. These solvents may be used alone or in combination of two or more. The primer coating composition may further contain a leveling agent to improve the coatability and an ultraviolet light absorber and antioxidant to improve the weather-resistance. The primer coating composition can be applied by any one of conventional methods such as a spin coating method and a dipping method without any limitation. The plastic lens may be, as required, subjected to a preliminary treatment such as alkali treatment, plasma treatment and ultraviolet light treatment.

The primer layer is formed on the lens substrate by applying the primer coating composition onto the plastic lens substrate and then heating the primer coating composition up to a temperature between 60° C. and 140° C., preferably 80° C. and 130° C. When the temperature is lower than 60° C., undesirably, the curing reaction hardly proceeds since the blocking agent of the blocked polyisocyanate is not dissociated. When the temperature is higher than 140° C., undesirably, the plastic lens is liable to be deformed. Although depending upon the heating temperature, the curing time is, for example, in the range of 10 minutes to 120 minutes.

The thickness of the primer layer is, for example, between 0.05 µm and 5 µm, preferably between 0.1 µm and 3 µm. When the thickness is less than 0.05 µm, the impact resistance is extremely low. When the thickness is greater than 5 µm, the surface accuracy of the primer layer is liable to be greatly poor.

A hard coating layer (C) is formed on the above primer layer (B). The hard coating agent for the formation of the hard coating layer is preferably selected from silicon-based resins. Particularly preferred is a composition which mainly contains a co-hydrolysis product of:

(1) inorganic oxide particles having an average particle diameter or from 50 to 200 Å such as colloidal silica and colloidal antimony oxide, or a silane compound having no functional group, and (2) a silane compound having a functional group such as an epoxy group and a methacryl group.

The above component (1) is contained preferably in an amount of 5 to 50% based on the total amount of the components (1) and (2). Examples of the above (2) silane compound having a functional group include λ-glycidoxypropyltrimethoxysilane, λ-glycidoxypropyl-methyl-diethoxysilane and λ-methacryloyloxypropyltrimethoxysilane.

The reason for preference to the silicon-based resin for the formation of the hard coating layer is that the silicon-based resin gives a hard coating layer having a higher hardness than that of a hard coating layer formed from a melamine or acrylic resin. If the hardness is not a factor of great weight, a melamine resin and an acrylic resin may be also used. The hard coating agent may be applied by any one of usually-employed methods such as a dipping method, a spray method and a spin coating method. A dipping method is the most suitable in view of operability. The applied hard coating agent is cured by means of heating, ultraviolet light or electron beam according to types of the hard coating agent, whereby the hard coating layer is formed on the polyurethane primer layer of the plastic lens surface. The hard (cured) coating preferably has a thickness of 2 to 5 µm and a refractive index of 1.40 to 1.50.

In the present invention, a single-layered or multi-layered anti-reflection coating layer (D) is formed on the above hard coating layer (C) from an inorganic material or inorganic materials. Examples of the inorganic material(s) preferably include metal oxides such as $SiO_2$ and $ZrO_2$ and fluorides such as $MgF_2$.

The single-layered or multi-layered anti-reflection coating layer is formed by any one of a vacuum deposition method, a sputtering method, an ion plating method and an ion beam assist method.

Examples of the multi-layered anti-reflection coating layer include an embodiment which has a layer of $ZrO_2$, a layer of $SiO_2$, a layer of $ZrO_2$ and a layer of $SiO_2$ in this order from the hard coating layer side, these layers having optical thicknesses, in the same order, of $\lambda_0/12$, $\lambda_0/12$, $\lambda_0/2$ and $\lambda_0/4$ in which $\lambda_0$ stands for a wavelength of 520 nm.

In the present invention, since the primer layer having a controlled refractive index is provided between the plastic lens substrate and the hard coating layer, no interference fringes are seen.

Further, since the primer layer is formed by a thermoplastic or thermosetting polyurethane having a refractive index controlled by the metal compound, the plastic lens of the present invention is excellent in impact resistance after the anti-reflection layer is provided, and excellent in resistance to weathering-induced yellowing.

Moreover, when having the primer layer containing the thermosetting polyurethane, the plastic lens is further excellent in impact resistance and passes the U.S. FDA standard. Even when the lens provided with the primer layer of the thermosetting polyurethane is immersed in a hard coating solution, no material is eluted into the hard coating solution since the polyurethane constituting the primer layer has a crosslinked structure. Therefore, the hard coating solution is not contaminated.

A study of the present inventors has also revealed the following: Even when the above primer layer (B) is replaced with a layer formed from a polyurethane containing at least one element selected from Cl, Br, I and S, the same effect as that obtained by the above primer layer (B) in the above plastic lens of the present invention can be produced.

Therefore, there is also similarly provided a plastic lens formed by laminating, in the order as described below, (A) a plastic lens substrate having a refractive index in the range of 1.50 to 1.70, (B') a primer layer formed from a polyurethane containing at least one element selected from the group consisting of Cl, Br, I and S, having a refractive index in the range of 1.45 to 1.60 and satisfying both the following equation (1), $$\sqrt{n_s \cdot n_H} + \frac{|n_s - n_H|}{4} \geq n_p \geq \sqrt{n_s \cdot n_H} - \frac{|n_s - n_H|}{4} \quad (1)$$

wherein:

$n_s$ is the refractive index of the plastic lens substrate (A), $n_H$ is the refractive index of a hard coating layer (C) to be described later, and $n_p$ is the refractive index of the primer layer (B'), and the following equation (2), $$d = \lambda/4n_p \quad (2)$$

wherein:

λ is the wavelength of visible light at 450 to 650 nm, $n_p$ is as defined above, and d is the thickness (nm) of the primer layer (B'), (C) a hard coating layer, and (D) a single-layered or multi-layered anti-reflection layer formed by vapor-depositing an inorganic substance.

The polyurethane of the primer layer (B') contains at least one element selected from the group consisting of Cl, Br, I and S. As the polyurethane, a thermosetting polyurethane is preferred.

The above polyurethane is obtained by reacting a polyol and/or a polythiol, as an active hydrogen compound, with a polyisocyanate.

Examples of the active hydrogen compound include a copolymer obtained From at least one of sec-butyl-α-bromoacrylate, cyclohexyl-α-bromoacrylate, methyl-α-bromoacrylate, 2-bromoethyl methacrylate, butylmercaptyl methacrylate and ethylmercaptyl methacrylate and 2-hydroxyethyl methacrylate; 2,2'-thiodiethanol; 2,2'-thiodipropanol; α-thioglycerol; 2-mercaptoethanol; pentaerythritol; tetra(3-mercaptopropionate); 2-bromo-1,3-propanediol; 2,2'-dibromo-1,3-propanediol; polyester from 2-bromo-1,3-propanediol and adipic acid; polyester from 2,2'-dibromo-1,3-propanediol and adipic acid; polyester from α-thioglycerol and 2,2'-dibromo-1,3-propanediol; a copolymer from 2-hydroxyethyl methacrylate and cyclohexyl α-chloroacrylate; a copolymer from 2-hydroxyethyl methacrylate and 2-chloroethyl α-chloroacrylate; 2,2'-diiodo-1,3-propanediol; and a polyester from 2,2'-diiodo-1,3-propanediol and adipic acid. These may be used alone or in combination. When the polyurethane contains at least one of the above halogen atoms other than fluorine or a sulfur atom, the refractive index of the primer layer can be increased up to 1.45 to 1.60.

The polyisocyanate for the preparation of the polyurethane is selected from hexamethylene diisocyanate, isophorone diisocyanate and addition products thereof.

Examples of the above addition products include biuret, isocyanurate, allophanate and carbodiimide. Further, there are included blocked polyisocyanates of which the isocyanate groups are blocked with a blocking agent. Examples of the blocking agent include β-diketone, oxime phenol and caprolactam. β-diketone is particularly preferred.

In the present invention, preferably, the thermosetting polyurethane is prepared by reacting the blocked polyisocyanate with a polyol and/or a polythiol, and the polyol and polythiol used in the reaction contain at least one element selected from the group consisting of Cl, Br, I and S.

In the present invention, naturally, there may be used a polyisocyanate containing a halogen atom other than fluorine or a sulfur atom instead of incorporating a halogen atom other than fluorine or a sulfur atom into a polyol or a polythiol.

It should be understood that the descriptions on the primer layer (B), made earlier in the present specification, can be applied to the other points of the primer layer (B').

It should be further understood that the descriptions made earlier in the present specification can be applied to the above plastic lens substrate (A), hard coating layer (C) and anti-reflection layer (D).

In Examples, lens having a plurality of layers were evaluated on their performances by the following methods.

1) Adhesion of layer

A cross-cut tape test was carried out in the following manner to evaluate the adhesion of a layer. That is, a layer formed on a lens was cut lengthwise and widthwise at intervals of 1 mm (to form 100 square cuts), and a cellophane adhesive tape was attached thereon and peeled off forcibly. Then, the number, m, of the square cuts remaining on the lens surface was counted, and the result was shown as m/100. For example, "100/100" shows that the layer was not peeled off at all in the cross-cut tape test.

2) Wear resistance

A plastic lens substrate having a primer layer and a hard coating layer was rubbed with #0000 steel wool to examine scratch resistance. The result was evaluated as follows.

A: No scratch by forcibly rubbing.

B: Slightly scratched by forcibly rubbing.

C: Scratched even by moderately rubbing.

3) Dyeability

A plastic lens was dyed by immersing it in a dye bath, prepared by adding 2 parts of an ordinary disperse dye (Plax Brown D, supplied by Hattori Seiko Co., Ltd.) and 3 parts of a Plax dye aid to 1,000 parts of water, at 90° C. for 10 minutes, and the resultant dyed lens was measured for a visible light transmittance with a TOPCON Sunglass Tester (supplied by Tokyo Optical Equipment Co., Ltd. ). A dyed plastic lens having a visible light transmittance of not more than 80% was evaluated to have good dyeability.

4) Adhesion of anti-reflection coating

An $SiO_2/ZrO_2$ type four-layer anti-reflection coating layer was formed on a substrate having a primer layer and a hard coating layer by a vacuum deposition method. The surface of the formed anti-reflection coating layer was rubbed with #0000 steel wool to examine a change in reflected color. The result was evaluated as follows.

A: No change in a reflected color by forcibly rubbing.

B: Scratched by forcibly rubbing and whitened in the scratched portion, but no change in reflected color in portions other than the scratched portion.

C: A layer was scratched off even by moderately rubbing, and the rubbed portion was completely whitened.

5) Impact resistance

A plastic lens was evaluated on impact resistance by a steel ball drop test, in which steel balls shown in Table 1 were allowed to drop gravitationally on the center of the lens one by one in the order from the lightest to a heavier one from a height of 127 cm. The weight of a steel ball positioned just before a steel ball which had cracked the lens was taken as a value for impact resistance. Table 2 shows the central thickness of each of lenses used in this test.

TABLE 1

| Reference chart of steel balls | | |
|---|---|---|
| No. | Diameter [mm] | Weight [g] |
| 1 | 6.35 | 1.04 |
| 2 | 7.94 | 2.04 |
| 3 | 8.73 | 2.72 |
| 4 | 9.53 | 3.53 |

TABLE 1-continued

Reference chart of steel balls

| No. | Diameter [mm] | Weight [g] |
|---|---|---|
| 5  | 10.0  | 4.08   |
| 6  | 10.32 | 4.48   |
| 7  | 11.11 | 5.59   |
| 8  | 11.96 | 6.88   |
| 9  | 12.30 | 7.60   |
| 10 | 12.70 | 8.36   |
| 11 | 13.49 | 10.02  |
| 12 | 14.29 | 11.90  |
| 13 | 15.08 | 13.99  |
| 14 | 15.88 | 16.32  |
| 15 | 16.66 | 18.89  |
| 16 | 17.46 | 21.72  |
| 17 | 18.26 | 24.52  |
| 18 | 19.05 | 28.20  |
| 19 | 19.84 | 31.87  |
| 20 | 20.64 | 35.85  |
| 21 | 21.43 | 40.15  |
| 22 | 22.23 | 44.78  |
| 23 | 23.02 | 49.75  |
| 24 | 23.81 | 55.07  |
| 25 | 24.00 | 56.88  |
| 26 | 25.00 | 63.73  |
| 27 | 25.40 | 66.84  |
| 28 | 26.99 | 80.17  |
| 29 | 28.58 | 95.17  |
| 30 | 30.16 | 111.9  |
| 31 | 31.75 | 130.5  |
| 32 | 33.34 | 151.1  |
| 33 | 34.93 | 173.8  |
| 34 | 36.51 | 198.5  |
| 35 | 38.10 | 225.6  |
| 36 | 41.28 | 286.8  |
| 37 | 44.45 | 358.2  |
| 38 | 47.63 | 440.6  |
| 39 | 50.80 | 534.7  |

6) Appearance

Light from a fluorescent lamp was thrown on a lens in a dark room, and the transparency of the lens was visually examined.

7) Interference fringe

Monochromatic light having a wavelength of 550 nm was thrown on a lens in a dark room, and the degree of contrast of interference fringe by reflection was visually evaluated. The evaluation was based on the following ratings.

A: Almost no interference fringe was observed.
B: A slight interference fringe was observed.
C: A clear interference fringe was observed.

8) Resistance to wethering-induced yellowing

A test piece was subjected to a 240 hour weathering test with an ultraviolet long life fadeometer (Suga Test Instruments Co., Ltd), and measured for the degree of yellowing.

The above tests on appearance, wear resistance, adhesion of an anti-reflection coating and impact resistance uses lenses having all of a primer layer, a hard coating layer and an anti-reflection coating layer. The above tests on adhesion of layer, dyeability, interference fringe and resistance to wethering-induced yellowing used lenses being provided with no anti-reflection layer but having a primer layer and a hard coating layer.

Example 1

(1) Preparation of plastic lens substrate

A mixed solution consisting of 20 parts by weight of 2-chlorophenylmaleimide, 20 parts by weight of a 2,2-bis(3, 5-dibromo-4-methacryloyloxyethoxyphenyl)propane, 30 parts by weight of tribromophenyl methacrylate, 25 parts by weight of diallyl isophthalate, 5 parts by weight of polyethylene glycol dimethacrylate (n=4), 1 part by weight of 2-(2'-hydroxy-3',5'-di-tert-butylphenyl)-5-chlorobenzotriazole as an ultraviolet light absorber and 2 parts by weight of tert-butylperoxy(2-ethylhexanoate) as a radical polymerization initiator was cast into a casting mold formed by a glass mold and a gasket made from an ethylene-vinyl acetate copolymer, and heated from 40° C. to 120° C. over 20 hours. The resultant lens was taken out from the glass mold and post-cured at 120° C. for 1 hour. The lens was an excellent optical lens having a refractive index, $n_S$, of 1.595 and having no internal strain. This optical lens was used as a plastic lens substrate in the following procedures.

(2) Preparation of primer coating composition and application and curing thereof A mixture of 2.40 parts by weight of a commercially available polyester type polyol (Desmophen 1700, supplied by Sumitomo Bayer Urethane Co., Ltd.), 0.80 part by weight of a commercially available blocked polyisocyanate (Desmodur IS-2759, a product obtained by blocking the isocyanate group of a cyclic trimer of hexamethylene diisocyanate with β-diketone, supplied by Sumitomo Bayer Urethane Co.. Ltd.). 3.0 parts by weight of a commercially available antimony pentoxide sol (Suncolloid AME-130, supplied by Nissan Chemical Industries, Ltd.), 0.01 part by weight of a commercially available fluorine-containing leveling agent (Fluorad FC-430, supplied by Sumitomo 3M Co., Ltd.), 46.90 parts by weight of a propylene glycol monomethyl ether as a solvent and 46.89 parts by weight of toluene also as a solvent was fully stirred to form a uniform primer coating composition.

The plastic lens substrate obtained in (1) was subjected to a preliminary treatment with an alkali, and the above-obtained primer coating composition was applied onto the plastic lens substrate by an immersion method (pulling-up rate: 10 cm/minute). Then, the lens was air-dried at room temperature for 15 minutes and heat-treated at 90° C. for 30 minutes to cure the primer, whereby a primer layer having a thickness of 0.09 μm and a refractive index, $n_p$, of 1.532 was formed on the lens.

(3) Application and curing of silicon-based hard coating agent

A commercially available dyeable silicon-based hard coating agent (C-339, supplied by Nippon ARC Co., Ltd.) was applied onto the primer layer of the primer layer-formed plastic lens substrate obtained in (2) by an immersion method (pulling-up rate: 40 cm/minute). The resultant lens was air-dried at room temperature for 15 minutes, and then heat-treated at 120° C. for 60 minutes, whereby a hard coating layer having a thickness varying between 2 μm (minimum) and 4 μm (maximum) and a refractive index, $n_H$, of 1.47 was formed.

On the basis of the refractive index of the plastic lens substrate, $n_s$=1.595, and the refractive index of the hard coating layer, $n_H$=1.470, the left and right sides of the equation (1) were calculated to give 1.562 and 1.500, and hence, the refractive index of the primer layer, $n_p$=1.532 satisfied the equation (1). Further, on the basis of the refractive index of the primer layer, $n_p$=1.532, and the wavelength of visible light, $\lambda$=552 nm, the right side of the equation (2) was calculated to give 0.090 μm. This value agreed with the thickness of the primer layer, d=0.090 μm.

(4) Formation of anti-reflection coating layer

An $SiO_2/ZrO_2$ type four-layered anti-reflection coating layer was formed on the hard coating layer of the plastic lens substrate having the primer layer and the silicon-based hard coating layer, obtained in (3), by a vacuum deposition method. That is, the anti-reflection coating layer consisted of a layer of $ZrO_2$, a layer of $SiO_2$, a layer of $ZrO_2$ and a layer of $SiO_2$ in this order from the hard coating layer side, these layers having optical thicknesses, in the same order, of $\lambda_0/12$, $\lambda_0/12$, $\lambda_0/2$ and $\lambda_0/4$ in which $\lambda_0$ stands for a wavelength of 520 nm. The so-obtained plastic lens having a composite layer was tested, and Table 2 shows the results.

Example 2

Example 1 was repeated except that the primer coating composition was replaced with the following primer coating composition and that the primer was cured under heat at 120° C. for 45 minutes.

The primer coating composition was prepared as a uniform coating composition by fully stirring a mixture consisting or 4.49 parts by weight of a commercially available acrylic polyol (Desmophen A-450, supplied by Sumitomo Bayer Urethane Co., Ltd.), 1.01 parts by weight of a commercially available blocked polyisocyanate (Desmodur BL-3175, a product obtained by blocking the isocyanate group of a cyclic trimer of hexamethylene diisocyanate with oxime, supplied by Sumitomo Bayer Urethane Co., Ltd.), 3.00 parts by weight of a commercially available antimony pentoxide sol (Suncolloid AME-130, supplied by Nissan Chemical Industries, Ltd.), 0.01 part by weight of dibutyltin dilaurate as a curing catalyst, 0.01 part by weight of a fluorine-containing leveling agent (Fluorad FC-430, supplied by Sumitomo 3M Co., Ltd.), 45.74 parts by weight of propylene glycol monomethyl ether as a solvent and 45.74 parts by weight of toluene also as a solvent.

The primer layer had a thickness of 0.090 μm and a refractive index of 1.525, which values satisfied the equations (1) and (2) ($\lambda$=549 nm). Table 2 shows the test results.

Example 3

Example 1 was repeated except that the primer coating composition was replaced with the following primer coating composition and that the primer was cured under heat at 120° C. for 45 minutes.

The primer coating composition was prepared as a uniform coating composition by fully stirring a mixture consisting of 4.49 parts by weight of a commercially available acrylic polyol (Desmophen A-450, supplied by Sumitomo Bayer Urethane Co., Ltd.), 1.01 parts by weight of a commercially available blocked polyisocyanate (Desmodur BL-3175, a product obtained by blocking the isocyanate group of a cyclic trimer of hexamethylene diisocyanate with oxime, supplied by Sumitomo Bayer Urethane Co., Ltd.), 4.00 parts by weight of a commercially available tin oxide sol (supplied by Nissan Chemical Industries, Ltd.), 0.01 part by weight of dibutyltin dilaurate as a curing catalyst, 0.01 part by weight of a fluorine-containing leveling agent (Fluorad FC-430, supplied by Sumitomo 3M Co., Ltd.), 45.24 parts by weight of propylene glycol monomethyl ether as a solvent and 45.24 parts by weight of toluene also as a solvent.

The primer layer had a thickness of 0.090 μm and a refractive index of 1.520, which values satisfied the equations (1) and (2) ($\lambda$=547 nm). Table 2 shows the test results.

Example 4

Example 1 was repeated except that the plastic lens substrate was replaced with the following substrate and that the hard coating layer was heat-treated at 90° C. for 6 hours.

50 Parts by weight of styrene, 48.5 parts by weight of 2,2-bis(3,5-dibromo-4-methacryloyloxyethoxyphenyl) propane, 2.8 parts by weight of diethylene glycol bisallylcarbonate, 1.5 parts by weight of t-butylperoxyneodecanoate and 0.2 part by weight of 2-(2'-hydroxy-3'-methylphenyl) benzotriazole are mixed and stirred. The mixture was filtered to remove insolubles, and the filtrate was cast into a space formed by a gasket of soft polyvinyl chloride and two glass molds. Then, the mixture was heated at 30° C. for 4 hours, linearly from 30° C. to 50° C. in the duration of 10 hours, linearly from 50° C. to 70° C. in the duration of 2 hours, at 70° C. for 1 hour and at 80° C. for 2 hours, and the gasket and the glass molds were removed. Further, the resultant lens was annealed at 110° C. for 2 hours to remove an internal strain within the lens. The so-obtained lens had a refractive index of 1.595 and was excellent as an optical plastic lens. The lens was measured for a glass transition temperature to show 108° C.

Table 2 shows the test results.

Example 5

Example 1 was repeated except that the primer coating composition was replaced with the following primer coating composition.

The primer coating composition was prepared as a uniform coating composition by fully stirring a mixture consisting of 2.40 parts by weight of a commercially available polyester type polyol (Desmophen 1700, supplied by Sumitomo Bayer Urethane Co., Ltd.), 0.80 part by weight of a commercially available blocked polyisocyanate (Desmodur LS-2759, a product obtained by blocking the isocyanate group of a cyclic trimer of hexamethylene diisocyanate with β-diketone, supplied by Sumitomo Bayer Urethane Co., Ltd.), 0.90 part by weight of a tetramer of tetra-n-butoxytitanium, 0.01 part by weight of a fluorine-containing leveling agent (Fluorad FC-430, supplied by Sumitomo 3M Co., Ltd.), 47.95 parts by weight of propylene glycol monomethyl ether as a solvent and 47.94 parts by weight of toluene also as a solvent.

The primer layer had a thickness of 0.089 μm and a refractive index of 1.530, which values satisfied the equations (1) and (2) ($\lambda$=545 nm). Table 2 shows the test results.

Example 6

Example 1 was repeated except that the primer coating composition was replaced with the following primer coating composition.

The primer coating composition was prepared as a uniform coating composition by fully stirring a mixture consisting of 2.40 parts by weight of a commercially available polyester type polyol (Desmophen 1700, supplied by Sumitomo Bayer Urethane Co., Ltd.), 0.80 part by weight of a commercially available blocked polyisocyanate (Desmodur LS-2759, a product obtained by blocking the isocyanate group of a cyclic trimer of hexamethylene diisocyanate with β-diketone, supplied by Sumitomo Bayer Urethane Co., Ltd.), 1.20 parts by weight of tetra-n-butoxyzirconium, 0.01 part by weight of a fluorine-containing leveling agent (Fluorad FC- 430, supplied by Sumitomo 3M Co., Ltd.), 47.80 parts by weight of propylene glycol monomethyl ether as a solvent and 47.79 parts by weight of toluene also as a solvent.

The primer layer had a thickness of 0.089 μm and a refractive index of 1.535, which values satisfied the equations (1) and (2) (λ=546 nm). Table 2 shows the test results.

Example 7

Example 1 was repeated except that the primer coating composition was replaced with the following primer coating composition.

The primer coating composition was prepared as a uniform coating composition by fully stirring a mixture consisting of 2.40 parts by weight of a commercially available polyester type polyol (Desmophen 1700, supplied by Sumitomo Bayer Urethane Co., Ltd.), 0.80 part by weight of a commercially available blocked polyisocyanate (Desmodur LS-2759, a product obtained by blocking the isocyanate group of a cyclic trimer of hexamethylene diisocyanate with β-diketone, supplied by Sumitomo Bayer Urethane Co., Ltd.), 0.90 part by weight of a tetramer of tetra-n-butoxytitanium monostearate, 0.01 part by weight of a fluorine-containing leveling agent (Fluorad FC-430, supplied by Sumitomo 3M Co., Ltd.). 47.95 parts by weight of propylene glycol monomethyl ether as a solvent and 47.94 parts by weight of toluene also as a solvent.

The primer layer had a thickness of 0.091 μm and a refractive index of 1.533, which values satisfied the equations (1) and (2) (λ=558 nm). Table 2 shows the test results.

Example 8

Example 5 was repeated except that the plastic lens substrate was replaced with the following plastic lens substrate and that the hard coating layer was cured by heating it at 90° C. for 6 hours.

9.4 Grams (0.050 mol) of m-xylene diisocyanate and 12.2 g (0.025 mol) of pentaerythritoltetra(3-mercaptopropionate) were uniformly mixed at room temperature, and the mixture was cast into a mold formed by a glass mold treated with a silicon-based, baking type mold releasing agent and a Teflon gasket. The mixture was cured by continuously heating it at 45° C. for 3 hours, at 60° C. for 2 hours and 80° C. for 8 hours. The so-obtained lens had a refractive index of 1.59, an Abbe number of 36 and a specific gravity of 1.34, had no internal strain and was excellent as an optical plastic lens.

Table 2 shows the test results.

Comparative Example 1

A plastic lens having a composite film was prepared in the same manner as in Example 1 except that no primer layer was provided.

Table 2 shows the test results.

Comparative Example 2

Example 1 was repeated except that the primer coating composition was replaced with the following composition and that the primer curing temperature was changed to 100° C.

6.8 Parts by weight of γ-glycidoxypropyltrimethoxysilane and 84.0 parts by weight of methyl isobutyl ketone were placed in a beaker and stirred. And, 48 parts by weight of isopropyl alcohol and 6 parts by weight of acetylacetone were added to prepare a uniform solution. Thereafter, 15.5 parts by weight of a tetramer of tetra-n-butoxytitanium was added, and the mixture was stirred for 30 minutes. Then, 0.05 Part by weight of 0.05N hydrochloric acid was added for hydrolysis. The mixture was aged for 24 hours, and then a small amount of ammonium perchlorate and a small amount of a surfactant were added to obtain the a primer coating composition.

The so-obtained primer layer had a thickness of 0.081 μm and a refractive index of 1.545. Table 2 shows the test results.

Comparative Example 3

Example 1 was repeated except that the primer coating composition was replaced with the following composition.

The primer coating composition was prepared as a uniform coating composition by fully stirring a mixture consisting of 6.60 parts by weight of a commercially available polyester type polyol having an aromatic ring (Desmophen 670-80B, supplied by Sumitomo Bayer Urethane Co., Ltd.), 6.30 parts by weight of a commercially available blocked polyisocyanate (Desmodur LS-2759, a product obtained by blocking the isocyanate group of a cyclic trimer of hexamethylene diisocyanate with β-diketone, supplied by Sumitomo Bayer Urethane Co., Ltd.), 0.05 part by weight of a fluorine-containing leveling agent (Fluorad FC-430, supplied by Sumitomo 3M Co., Ltd.), 87.05 parts by weight of propylene glycol monomethyl ether as a solvent.

The so-obtained primer layer had a refractive index of 1.533. Table 2 shows the test results.

TABLE 2

|  | Adhesion of layer | Wear resistance | Dyeability | Adhesion of anti-reflection coating layer | Impact resistance (g) | Appearance | Interference fringes | Resistance to wethering-induced yellowing |
|---|---|---|---|---|---|---|---|---|
| Example 1 | 100/100 | A | good | A | 31.87 | good | A | 2.2 |
| Example 2 | " | A | good | A | 28.20 | good | A | 1.9 |
| Example 3 | " | A | good | A | 35.85 | good | A | 2.0 |
| Example 4 | " | A | good | A | 28.20 | good | A | 2.2 |
| Example 5 | " | A | good | A | 31.87 | good | A | 1.9 |
| Example 6 | " | A | good | A | 31.87 | good | A | 2.1 |
| Example 7 | " | A | good | A | 28.20 | good | A | 1.9 |
| Example 8 | " | A | good | A | 111.9 | good | A | 2.0 |

TABLE 2-continued

|  | Adhesion of layer | Wear resistance | Dye-ability | Adhesion of anti-reflection coating layer | Impact resistance (g) | Appearance | Interference fringes | Resistance to wethering-induced yellowing |
|---|---|---|---|---|---|---|---|---|
| Comparative Example 1 | " | A | bad | A | 4.48 | good | C | 2.0 |
| Comparative Example 2 | " | A | bad | A | 4.08 | good | A | 2.1 |
| Comparative Example 3 | " | A | good | A | 28.20 | good | A | 5.2 |

Example 9

The primer coating composition was prepared, applied and cured as follows.

(1) Preparation of 2-hydroxyethyl methacrylate (30 parts by weight)-methyl-α-bromoacrylate (70 parts by weight) copolymer solution:

30 Grams of 2-hydroxyethyl methacrylate, 70 g of methyl-α-bromoacrylate and 0.5 g of AIBN were added to 100 g of butyl acetate, and while the resultant mixture was moderately stirred, its temperature was increased up to 90° C. The stirring was continued for about 4 hours with blowing in nitrogen. The thus-obtained solution was a pale-yellow solution, which was found to be a 2-hydroxyethyl methacrylate-methyl-α-bromoacrylate copolymer having a viscosity of about 500 cps.

(2) Preparation of primer coating composition:

A mixture consisting of 14.59 parts by weight of the above 2-hydroxyethyl methacrylate-methyl-α-bromoacrylate copolymer as a polyol, 3.61 parts by weight of a commercially available polyisocyanate (Sumidur N-75, biuret of hexamethylenediamine, supplied by Sumitomo-Bayer Urethane Co., Ltd. ), 0.01 parts by weight of dibutyltin dilaurate as a curing agent, 0.05 part by weight of a commercially available leveling agent (Fluorad FC-430, supplied by Sumitomo 3M Co., Ltd.) and 81.74 parts by weight of propylene glycol monomethyl ether as a solvent was fully stirred to form a uniform primer coating composition.

(3) Application and curing of primer coating composition:

The above primer coating composition was coated on the same alkali-pretreated plastic lens substrate as that obtained Example 1 by an immersing method (pulling-up rate: 10 cm/minute), and the coated lens was air-dried at room temperature for 15 minutes and then heat-treated at 90° C. for 30 minutes to cure the primer. The so-formed primer layer had a thickness of 0.090 μm and a refractive index, $n_p$, of 1.530.

The procedures except the above procedure were carried out in the same manner as in Example 1. Table 3 shows the results.

On the basis of the refractive index of the plastic lens substrate, $n_s$=1.595. and the refractive index of the hard coating layer, $n_H$=1.470, the left and right sides of the equation (1) were calculated to give 1.562 and 1.500, and hence, the refractive index of the primer layer, $n_p$=1.530 satisfied the equation (1).

Further, on the basis of the refractive index of the primer layer, $n_p$=1.530 and the wavelength of visible light, $\lambda$=551 nm, the right side of the equation (2) was calculated to give 0.090 μm. This value agreed with the thickness of the primer layer, d=0.090 μm.

Example 10

Example 9 was repeated except that the primer coating composition was replaced with the following composition.

The primer coating composition was prepared as a uniform solution by fully stirring a mixture consisting of 11.86 parts by weight of the above 2-hydroxyethyl methacrylate-methyl-α-bromoacrylate copolymer as a polyol, 5.43 parts by weight of a commercially available, blocked polyisocyanate (Desmodur LS-2759, a product obtained by blocking the isocyanate group of a cyclic trimer of hexamethylene diisocyanate (isocyanurate) with β-diketone, supplied by Sumitomo Bayer Urethane Co., Ltd.), 0.05 part by weight of a fluorine-containing leveling agent (Fluorad FC-430, supplied by Sumitomo 3M Co., Ltd.) and 82.66 parts by weight of propylene glycol monomethyl ether as a solvent.

The primer layer had a thickness of 0.090 μm and a refractive index of 1.525, which values satisfied the equations (1) and (2) ($\lambda$=549 nm). Table 3 shows the test results.

Example 11

Example 9 was repeated except that the primer coating composition was replaced with the following composition.

The primer coating composition was prepared as a uniform solution by fully stirring a mixture consisting of 2.57 parts by weight of pentaerythritoltetra(3-mercaptopropionate), 9.91 parts by weight of a commercially available blocked polyisocyanate, Desmodur LD-2759, 0.05 part by weight of a fluorine-containing leveling agent (Fluorad FC-430, supplied by Sumitomo 3M Co., Ltd.) and 87.47 parts by weight of propylene glycol monomethyl ether as a solvent.

The primer layer had a thickness of 0.090 μm and a refractive index of 1.520, which values satisfied the equations (1) and (2) ($\lambda$=547 nm). Table 3 shows the test results.

Example 12

50 Parts by weight of styrene, 48.5 parts by weight of 2,2-bis(3,5-dibromo-4-methacryloyloxyethoxyphenyl) propane, 2.8 parts by weight of diethylene glycol bisallylcarbonate, 1.5 parts by weight of t-butylperoxyneodecanoate and 0.2 part by weight of 2-(2'-hydroxy-3'-methylphenyl) benzotriazole were mixed and the mixture was stirred. The mixture was filtered to remove insolubles, and the filtrate was cast into a space formed by a gasket made of soft polyvinyl chloride and two glass molds. Then, the mixture was heated at 30° C. for 4 hours, linearly from 30° C. to 50° C. in the duration of 10 hours, linearly from 50° C. to 70° C. in the duration of 2 hours, at 70° C. for 1 hour and at 80° C. for 2 hours, and the gasket and the glass molds were removed. Further, the resultant lens was annealed at 110° C. for 2 hours to remove an internal strain within the lens. The so-obtained lens had a refractive index of 1.595 and was excellent as an optical plastic lens.

The above-obtained lens was measured for a glass transition temperature to show 108°.

Example 10 was repeated except that the plastic lens substrate was replaced with the above lens substrate and that the hard coating layer cured by heat-treating it at 90° C. for 6 hours. Table 3 shows the test results.

Example 13

Example 11 was repeated except that the plastic lens substrate was replaced with the same plastic lens substrate as that obtained in Example 12 and that the hard coating layer was cured by heat-treating it at 90° C. for 6 hours. Table 3 shows the results.

TABLE 3

|  | Adhesion of layer | Wear resistance | Dye-ability | Adhesion of anti-reflection coating layer | Central thickness of lens (mm) | Impact resistance (g) | Appearance | Interference fringes | Resistance to wethering-induced yellowing |
|---|---|---|---|---|---|---|---|---|---|
| Example 9 | 100/100 | A | good | A | 1.5 | 28.20 | good | A | 2.1 |
| Example 10 | " | A | good | A | 1.5 | 35.85 | good | A | 1.9 |
| Example 11 | " | A | good | A | 1.5 | 24.52 | good | A | 1.9 |
| Example 12 | " | A | good | A | 1.5 | 24.52 | good | A | 2.0 |
| Example 13 | " | A | good | A | 1.5 | 21.72 | good | A | 2.2 |

What is claimed is:

1. A plastic lens formed by laminating, in the order described below,
   (A) a plastic lens substrate having a refractive index in the range of 1.50 to 1.70,
   (B) a primer layer containing a metal compound of at least one metal selected from the group consisting of Al, Ti, Zr, Sn and Sb and a thermosetting polyurethane obtained by reacting a blocked polyisocyanate and a polyol, and having a refractive index in the range of 1.45 to 1.60 and satisfying both the following equation (1), $$\sqrt{n_s \cdot n_H} + \frac{|n_s - n_H|}{4} \geq n_p \geq \sqrt{n_s \cdot n_H} - \frac{|n_s - n_H|}{4} \quad (1)$$

wherein:
   $n_s$ is the refractive index of the plastic lens substrate (A),
   $n_H$ is the refractive index of a coating layer (C) to be described below, and
   $n_p$ is the refractive index of the primer layer (B),
and the following equation (2), $$D = \lambda/4n_p \quad (2)$$

wherein:
   $\lambda$ is the wavelength of visible light at 450 to 650 nm,
   $n_p$ is as defined above, and
   d is the thickness (nm) of the primer layer (B),
   (C) a coating layer comprising a silicon based resin, and
   (D) a single-layered or multi-layered anti-reflection layer formed by vapor-depositing an inorganic substance.

2. The plastic lens of claim 1, wherein the blocked polyisocyanate is a product obtained by blocking an isocyanate group of a cyclic trimer of hexamethylene diisocyanate with β-diketone.

3. The plastic lens of claim 1, wherein the polyol is a polyester polyol, an acrylic polyol or a mixture of these.

4. The plastic lens of claim 1, wherein the metal compound contained in the primer layer (B) is fine particles of metal oxide or an organometallic compound the particles having an average particle diameter of 1 to 300 mμ.

5. The plastic lens of claim 1, wherein the primer layer contains the metal compound in an amount of 1 to 80% by weight based on the primer layer.

6. The plastic lens of claim 1, wherein the plastic lens substrate (A) has a glass transition temperature of not more than 110° C.

7. The plastic lens of claim 1, wherein the plastic lens substrate is a product obtained by radical-polymerizing a monomer mixture containing an N-substituted phenylmaleimide.

8. The plastic lens of claim 4, wherein the organometallic compound is at least one member selected from the group consisting of alcoholates, acylates, chelates and decomposition polycondensation products of these.

9. A plastic lens formed by laminating, in the order described below,
   (A) a plastic lens substrate having a refractive index in the range of 1.50 to 1.70,
   (B') a primer layer formed from a polyurethane containing at least one element selected from the group consisting of Cl, Br, I and S, having a refractive index in the range of 1.45 to 1.60 and satisfying both the following equation (1), $$\sqrt{n_s \cdot n_H} + \frac{|n_s - n_H|}{4} \geq n_p \geq \sqrt{n_s \cdot n_H} - \frac{|n_s - n_H|}{4} \quad (1)$$

wherein:
   $n_s$ is the refractive index of the plastic lens substrate (A),
   $n_H$ is the refractive index of a coating layer (C) to be described later, and
   $n_p$ is the refractive index of the primer layer (B'),
and the following equation (2), $$d = \lambda/4n_p \quad (2)$$

wherein:
   $\lambda$ is the wavelength of visible light at 450 to 650 nm,
   $n_p$ is as defined above, and
   d is the thickness (nm) of the primer layer (B'),
   (C) a coating layer comprising a silicon based resin, and (D) a single-layered or multi-layered anti-reflection layer formed by vapor-depositing an inorganic substance.

10. The plastic lens of claim 9, wherein the polyurethane contained in the primer layer (B') is a thermosetting polyurethane.

11. The plastic lens of claim 10, wherein the thermosetting polyurethane is a product obtained by reacting a blocked polyisocyanate with a member selected from the group consisting of a polyol, a polythiol and a combination of a polyol and a polythiol, and the polyol, the polythiol or a combination of the polyol and the polythiol contains at least one element selected from the group consisting of Cl, Br, I and S.

* * * * *